(12) United States Patent
Geisert et al.

(10) Patent No.: US 9,176,804 B2
(45) Date of Patent: Nov. 3, 2015

(54) MEMORY DUMP OPTIMIZATION IN A SYSTEM

(71) Applicant: International Business Machines Corporation, Armonk, NY (US)

(72) Inventors: Franziska Geisert, Altdorf (DE); Jakob C. Lang, Altdorf (DE); Angel Nunez Mencias, Stuttgart (DE); Jochen Schweflinghaus, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 13/929,021

(22) Filed: Jun. 27, 2013

(65) Prior Publication Data

US 2015/0006822 A1 Jan. 1, 2015

(51) Int. Cl.
G06F 11/00 (2006.01)
G06F 11/07 (2006.01)
G06F 11/36 (2006.01)

(52) U.S. Cl.
CPC ........ *G06F 11/0778* (2013.01); *G06F 11/0715* (2013.01); *G06F 11/0781* (2013.01); *G06F 11/366* (2013.01)

(58) Field of Classification Search
None
See application file for complete search history.

(56) References Cited

U.S. PATENT DOCUMENTS

| | | | |
|---|---|---|---|
| 5,293,612 A * | 3/1994 | Shingai | 711/159 |
| 6,182,243 B1 * | 1/2001 | Berthe et al. | 714/38.11 |
| 6,226,761 B1 * | 5/2001 | Berstis | 714/37 |
| 6,681,348 B1 | 1/2004 | Vachon | |
| 7,496,794 B1 * | 2/2009 | Eastham et al. | 714/37 |
| 7,783,932 B1 * | 8/2010 | Eigen et al. | 714/45 |
| 2002/0166083 A1 * | 11/2002 | Anderson et al. | 714/37 |
| 2006/0136877 A1 * | 6/2006 | Gdaniec et al. | 717/127 |
| 2008/0270994 A1 | 10/2008 | Li et al. | |
| 2008/0294839 A1 | 11/2008 | Bell et al. | |
| 2009/0089336 A1 * | 4/2009 | Dewey et al. | 707/200 |
| 2009/0106278 A1 * | 4/2009 | Ramacher et al. | 707/100 |
| 2012/0304015 A1 | 11/2012 | Devegowda et al. | |
| 2012/0304019 A1 | 11/2012 | Li et al. | |

(Continued)

FOREIGN PATENT DOCUMENTS

| JP | 2005332421 A | 12/2005 |
|---|---|---|
| JP | 2007257486 A | 10/2007 |
| JP | 2008293108 A | 12/2008 |

OTHER PUBLICATIONS

IBM, "Method to reduce file sizes for a sequence of computer diagnostic memory dumps", ip.com, An IP.com Prior Art Database Technical Disclosure, Original Publication Date: Aug. 24, 2009, IP.com No. IPCOM000186503D, IP.com Electronic Publication: Aug. 24, 2009, pp. 1-2.

(Continued)

*Primary Examiner* — Gabriel Chu
(74) *Attorney, Agent, or Firm* — Stephen R. Yoder

(57) ABSTRACT

Reducing memory dump data size by: (i) receiving a memory dump data including a set of stack(s), including at least a first stack which includes a current stack portion; (ii) removing from the memory dump data a first removed data portion that comes from a portion of the first stack to yield an optimized memory dump data; (iii) determining respective ranking values for a plurality of ranked data portions from the set of stacks; and (iv) selecting a ranked data portion from the current stack portion of the first stack to be a first removed data portion based, at least in part, upon the ranking values.

13 Claims, 4 Drawing Sheets

(56) References Cited

U.S. PATENT DOCUMENTS

2012/0324194 A1 12/2012 Jacobs et al.
2015/0006963 A1 1/2015 Geisert et al.

OTHER PUBLICATIONS

"Core dump", Wikipedia, the free encyclopedia, As of Jun. 3, 2013, page last modified on May 25, 2013, <http://en.wikipedia.org/w/index.php?title=Core_dump&oldid=556750251>.

"Stack-based memory allocation", Wikipedia, the free encyclopedia, as of May 17, 2013, page last modified on Feb. 18, 2013, <http://en.wikipedia.org/w/index.php?title=Stack-based_memory_allocation&oldid=538795925>.

"Thread (computing)", Wikipedia, the free encyclopedia, as of May 1, 2013, page last modified on May 1, 2013, <http://en.wikipedia.org/w/index.php?title=Thread_(computing)&oldid=553095335>.

\* cited by examiner

MEMORY DUMP OPTIMIZATION IN A SYSTEM

FIELD OF THE INVENTION

The present invention relates generally to the field of memory dumps, and more particularly to memory dump size reduction.

BACKGROUND OF THE INVENTION

A thread of execution, kernel thread, or simply "thread," is a sequence of programmed instructions, or functions, managed independently by an operating system scheduler. In most cases, a thread is contained inside a process. Multiple threads can exist within the same process and share resources including: (i) instruction code; (ii) variable values at any given moment (context); (iii) process state; (iv) memory; and (v) address space.

Each thread has a reserved region of memory referred to as its stack. The stack is made of current stackframes. See Definitions section of the Detailed Description for the definitions of "stack" and "current stackframes." Each stackframe relates to a function executed by the tread and usually contains a header (with a pointer to the previous stackframe), the variables allocated by the function and also a copy of the register values (like the program counter) from the time when the function was called. Initially the stack does not contain current stackframes and its content is old data, or non-current stack portions (also sometimes called "garbage"). See Definitions sub-section of the Detail Description section for the definition of current stackframes. However, as the thread executes, its stack begins to fill with current stackframes. The number of current stackframes in the stack grows and decreases during the execution depending on the number of functions in the call graph (also called call-chain).

When a function is called, the calling function may create a new stackframe and store some registers there defined by the application binary interface (ABI). The called function may grow the stackframe that the caller created to include some temporary variables (with a lifescope equal to or less than the execution time of the function) of the function and preserve additional registers as defined by the ABI. When the function exits, the function restores the original register values from the stack, including the program counter that contains an address within the caller function. On return, the caller function deletes the stackframe, but usually, for the sake of performance, the memory is not clean and just the end of stack pointer is updated. If a region of memory lies on the thread's stack, that memory is said to have been allocated on the stack.

Memory dumps are useful in debugging software problems. Typical dump size is growing quickly, because, among other reasons, the number of threads used in a typical program is growing, making it difficult to store and/or transmit the data of the memory dump (the data of a memory dump is also commonly referred to as a "memory dump" or "dump"). It is known to split memory dumps into regions and truncate the dumps to be limited to only the important regions. It is also known to apply data compression techniques to the memory dump, thus reducing the dump size. A memory dump may include: (i) all of the stacks; (ii) none of the stacks; and/or (iii) selected whole stacks (such as the whole stack of the crashing thread).

SUMMARY

Embodiments of the present invention disclose a method, computer program, and system having a process that includes: (i) receiving a memory dump data including a set of stack(s), including at least a first stack which includes a current stack portion; and (ii) removing from the memory dump data a first removed data portion that comes from a portion of the first stack to yield an optimized memory dump data.

DETAILED DESCRIPTION

Figure 1:
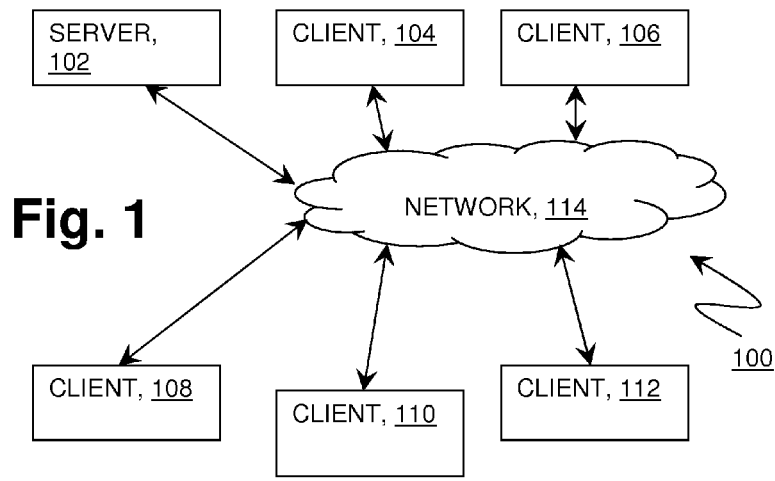
FIG. 1 is a schematic view of a first embodiment of a computer system (that is, a system including one or more processing devices) according to the present invention.

This DETAILED DESCRIPTION section will be divided into the following sub-sections: (i) The Hardware and Software Environment; (ii) Operation of Embodiment(s) of the Present Invention; (iii) Further Comments and/or Embodiments; and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 2:
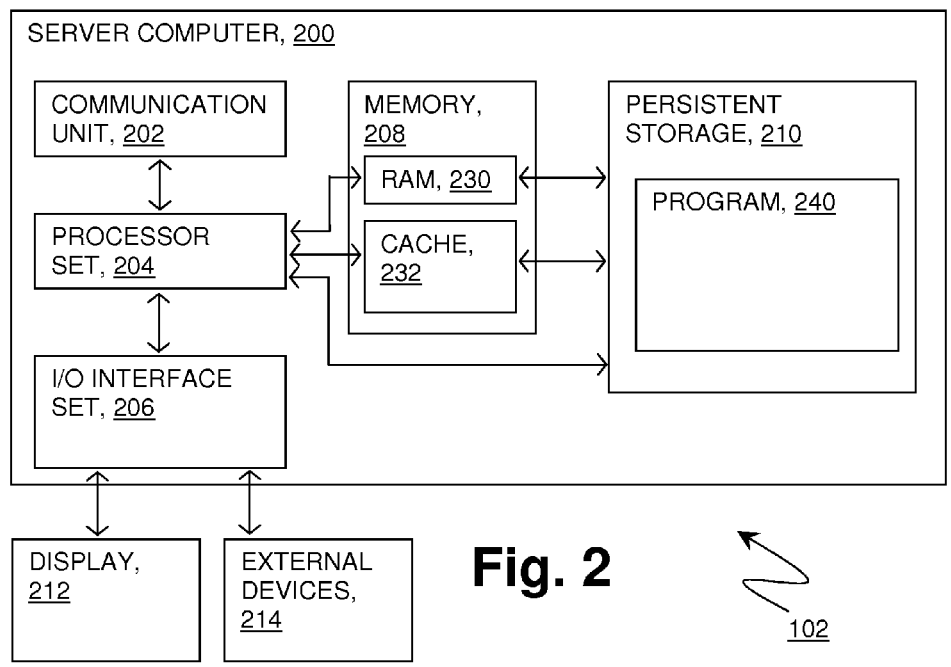
FIG. 2 is a schematic view of a computer sub-system (that is, a part of the computer system that itself includes a processing device) portion of the first embodiment computer system.

An embodiment of a possible hardware and software environment for software and/or methods according to the present invention will now be described in detail with reference to the Figures. FIGS. 1 and 2 collectively make up a functional block diagram illustrating various portions of distributed data processing system 100, including: server computer sub-system (that is, a portion of the larger computer system that itself includes a computer) 102; client computer sub-systems 104, 106, 108, 110, 112; communication network 114; server computer 200; communication unit 202; processor set 204; input/output (i/o) unit 206; memory device 208; persistent storage device 210; display device 212; external device set 214; random access memory (RAM) devices 230; cache memory device 232; and program 240.

As shown in FIG. 2, server computer sub-system 102 is, in many respects, representative of the various computer sub-system(s) in the present invention. Accordingly, several portions of computer sub-system 102 will now be discussed in the following paragraphs.

Server computer sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 240 is a representative piece of software, and is a collection of machine readable instructions and data that is used to create, manage and control certain software functions that will be discussed in detail, below, in the Operation of the Embodiment(s) sub-section of this Detailed Description section.

Server computer sub-system 102 is capable of communicating with other computer sub-systems via network 114 (see FIG. 1). Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

It should be appreciated that FIGS. 1 and 2, taken together, provide only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

As shown in FIG. 2, server computer sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 240 is in many respects representative of the various software modules of the present invention and is stored in persistent storage 210 for access and/or execution by one or more of the respective computer processors 204, usually through one or more memories of memory 208. Persistent storage 210: (i) is at least more persistent than a signal in transit; (ii) stores the device on a tangible medium (such as magnetic or optical domains); and (iii) is substantially less persistent than permanent storage. Alternatively, data storage may be more persistent and/or permanent than the type of storage provided by persistent storage 210.

Program 240 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as client sub-systems 104, 106, 108, 110, 112. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface(s) 206 allows for input and output of data with other devices that may be connected locally in data communication with server computer 200. For example, I/O interface 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 240, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Operation of Embodiment(S) of the Present Invention

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
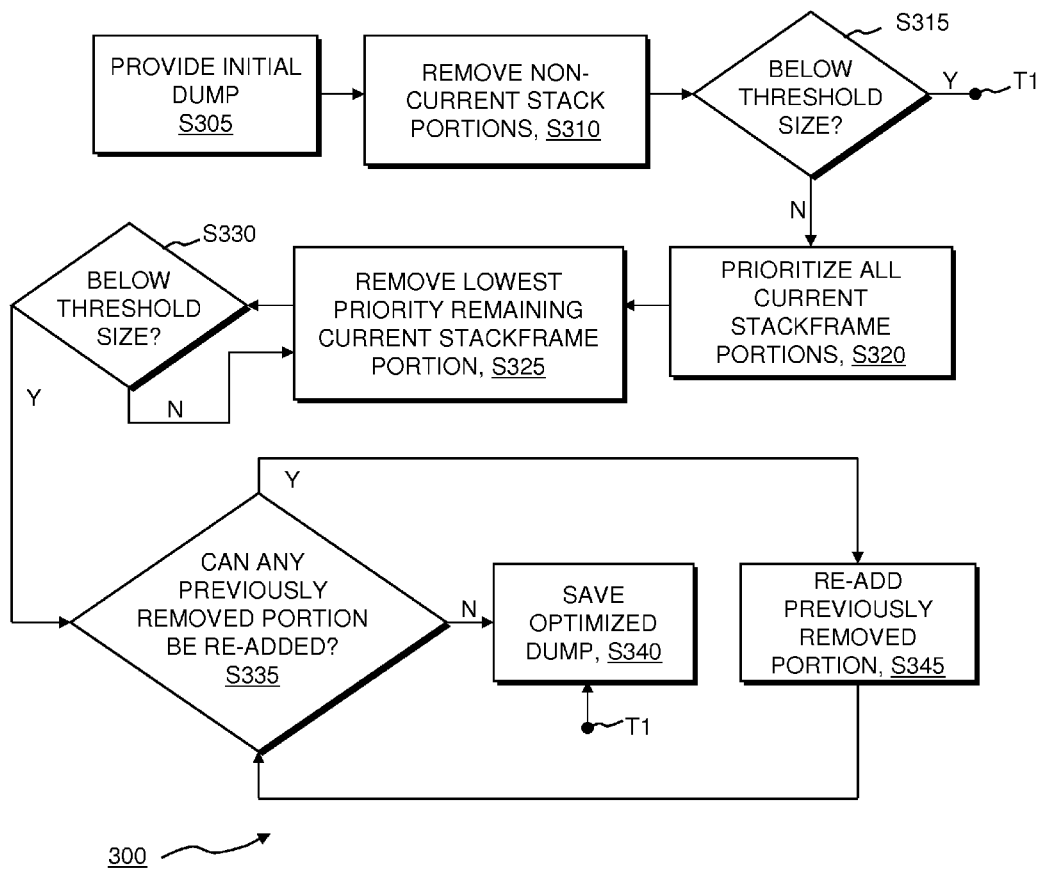
FIG. 3 is a flowchart showing a process performed, at least in part, by the first embodiment computer system.
Figure 4:
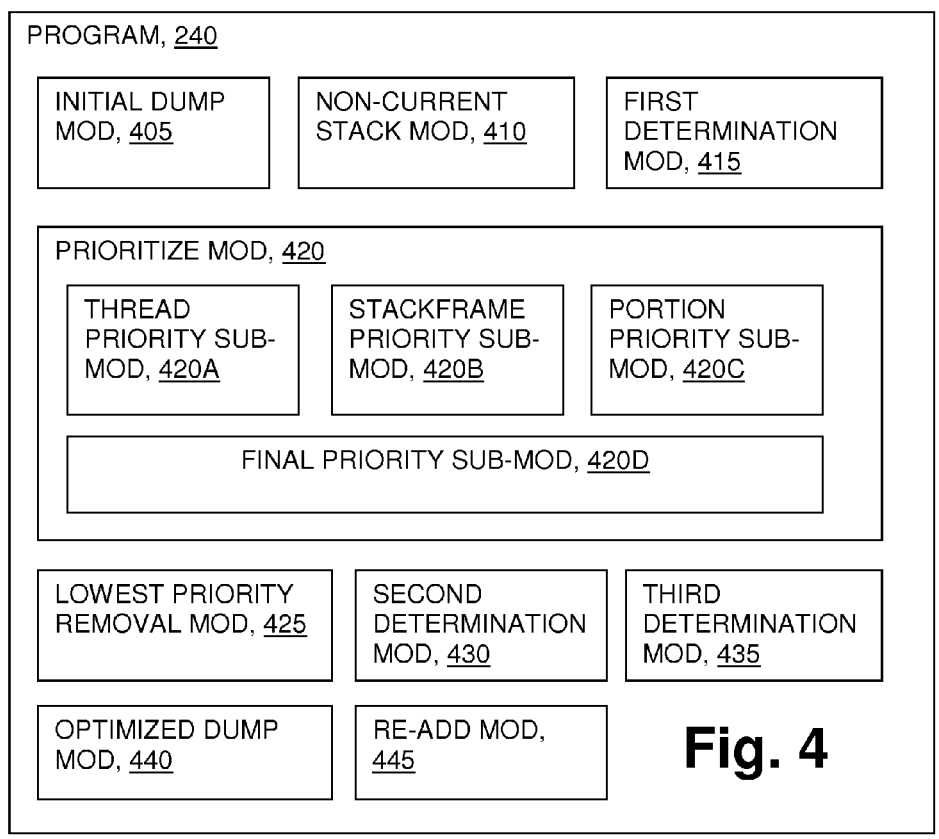
FIG. 4 is a schematic view of a portion of the first embodiment computer system.

FIG. 3 shows a flow chart 300 depicting a method according to the present invention. FIG. 4 shows program 240 for performing at least some of the method steps of flow chart 300. This method and associated software will now be discussed, over the course of the following paragraphs, with extensive reference to FIG. 3 (for the method step blocks) and FIG. 4 (for the software blocks).

Processing begins at step S305, where initial dump module 405 receives a memory dump. A memory dump (also known as a core dump, or system dump) is the recorded state of the working memory of a computer program at a specific time (that is, all of the used main memory address space content) including: (i) stacks of the threads of executing programs including: (a) processor registers; (b) program counter; and (c) stack pointer; (ii) memory management information; and (iii) other processor and operating system flags and information.

A memory dump is generally created by client computer sub-system 104, 106, 108, 110, or 112 (see FIG. 1) when its client computer crashes, or other malfunctions occur. Memory dumps usually include stacks for multiple threads. At the time of the initial dump of step S305, each thread has a size equal to the memory originally allocated for the respective thread's stack.

Processing proceeds to step S310, where non-current stack portion module 410 processes any non-current stack portions within the memory dump. "Non-current stack portions" is hereby defined as any portions of an allocated stack that are: (i) unused portions; and/or (ii) portions that have been used for any other purpose, by a thread, for storing any data other than stackframe data. Stacks according to this embodiment of the present invention are made up of current stackframes and non-current stack portions, or unused space. Note that some embodiments of the present invention operate on portions of stacks, recognizing that all stack portions are not equally useful to debugging and are not equally important to store as memory dump data. At the time of memory allocation, the thread starts entirely as unused space. During system operation, current stackframes are added to a thread's stack, in the order in which processes, corresponding to the stackframes, occur. The unused space of the thread (especially the non-current stack portions) is of little or no use when debugging a system failure. Mod 410 performs one or more of the following actions: (i) identify any non-current stack portions in the memory dump; and (ii) remove the non-current stack portions from the memory dump.

Processing proceeds to step S315, where first determination module 415 determines whether the memory dump, as reduced in size by removing non-current stack portions, is a size below a threshold size.

The threshold size is a limit on the memory available to be used in the memory dump. The threshold size may be determined based on various factors including: (i) available system memory; and/or (ii) provision of memory to memory dumps. If the dump size is determined to be below the threshold size at step S315, then processing proceeds to step S340, where optimized dump module 440 stores the memory dump data (without its non-current stack portions) as a file or part of a file for debug analysis and/or other purposes.

If the dump size is above the threshold size, processing proceeds to step S320, where prioritize module 420 ranks a set of all components of all current stackframes of all stacks that are included in the memory dump data. Alternatively, current stackframes could be ranked on a stackframe-by-stackframe basis, rather than on a stackframe-component-by-stackframe-component basis as in process 300. In this embodiment, each stackframe has three components as follows: (i) header; (ii) local variable; and (iii) registers. Alternatively, stackframes may be defined to have different components, or a different number of components. Process 300 ranks the components of all current stackframes of all current stack portions in a single ranking. Alternatively, each current stack portion could have a separate ranking of its stackframes and/or stackframe components.

As an alternative process flow, step S320 could start after step S305, excluding steps S310 and S315. As a further alternative process flow, the process could omit all steps except S305, S310, and S340.

Module 420 ranks the stackframe components based on three (3) factors as follows: (i) thread priority (determined by thread priority sub-module 420A); (ii) stackframe priority (determined by stackframe priority sub-module 420B); and (iii) component priority (determined by component priority sub-module 420C). Those of skill in the art understand that some thread's stacks are more important for debugging purposes than other thread's stacks. Accordingly, the thread priority factor correlates with how important a given thread's stack is likely to be for debugging purposes (and/or other objectives that the system designer wants to help with, the objectives being any objectives now known or to be developed in the future). Those of skill in the art understand that some stackframes in a given thread are more important for debugging purposes than other stackframes in that same stack. Accordingly, the stackframe priority factor correlates with how important a given stackframe is likely to be for debugging purposes (and/or other objectives that the system designer wants to help with, the objectives being any objectives now known or to be developed in the future). Those of skill in the art understand that some stackframe components are more important for debugging purposes than other stackframe components. Accordingly, the thread priority factor correlates with how important a given component is likely to be for debugging purposes (and/or other objectives that the system designer wants to help with, the objectives being any objectives now known or to be developed in the future). Specific examples of all of these different types of factors will be discussed, below, in the Further Comments and/or Embodiments sub-section.

Final priority sub-module 420D mathematically combines the three (3) factors to determine each component's ranking value. One possible specific equation for combining the factors is discussed in further detail below. Alternatively, module 420 may rank the current stackframes with regard to only 1 or 2 of the three factors. For example, the current stackframe ranking factors may only include: (i) thread priority. Alternatively, module 420 may rank stackframe components with regard to only: (i) stackframe priority; and (ii) thread priority.

Processing proceeds to step S325, where lowest priority removal module 425 removes the lowest ranking stackframe component of the memory dump. Alternatively, the lowest ranking thread may be removed or the lowest ranking stackframe may be removed. Note that some embodiments of the present invention operate on current stack portions, recognizing that all stack portions are not equally useful to debugging and are not equally important to store as memory dump data.

Processing proceeds to step S330, where second determination module 430 determines whether the memory dump, as reduced in size by removing the lowest ranking stackframe component, is below the threshold size. If the memory dump size is above the threshold size, processing returns to step S325, where module 425 removes the lowest ranking remaining stackframe component. Processing steps S325 and S330 form a process loop until second determination module 430 determines that the memory dump size is below the threshold size.

In the illustrated embodiment, each time the loop returns to step S325, module 425 removes the next lowest ranking stackframe component. Alternatively, the lowest ranking thread may be removed in a first iteration, then the lowest ranking remaining stackframe components may be removed in a second iteration, and so forth.

When the memory dump size is below the threshold size, processing proceeds to step S335, where third determination module 435 determines whether any previously removed current stackframe components can be added to the dump without causing the memory dump size to exceed the threshold size. If at least one removed component can be re-added without causing the memory dump size to exceed the threshold size, processing proceeds to step S345, where re-add module 445 re-adds the highest ranking current stackframe component that can be re-added without exceeding the threshold size. Processing steps S335 and S340 form a process loop until third determination module 435 determines that there are no more current stackframe components that can be re-added to the memory dump without causing the memory dump size to exceed the threshold size. Alternatively, previously removed stackframes and/or threads may be re-added according to priority so long as the memory dump size remains below the threshold size.

When third determination module 435 determines that there are no more stackframe components that can be re-added at step S335, then processing proceeds to step S340, where optimized dump module 440 stores the memory dump data (being a size at or below the threshold size) as a file or part of a file for debug analysis and/or other purposes.

III. Further Comments and/or Embodiments

Some embodiments of the present invention recognize that splitting memory dumps into regions and truncating the dumps to include only the regions deemed as "important" can potentially result in the loss of useful information. Some embodiments of the present invention further recognize that compressing the memory dump may not reduce the data size of the dump sufficiently to resolve all dump size related issues.

Some embodiments of the present invention process memory dumps including all of the used main memory address space content, such as all stacks of the threads corresponding to program execution.

Some embodiments of the present invention provide an intelligent way to manage memory dumps based on analysis of the content of a current dump.

Some embodiments of the present invention recognize that a large part of the memory dump is due to data from the stacks and/or from memory allocation. The reason that data from threads and/or memory allocation has become so large is because the typical number of threads is increasing year after year. Depending on the number of threads and the size of the stack, a large amount of data is often generated by threads and/or memory allocation. For example, a system having up to 144 threads, with each thread using 3 MB (megabytes) of stack, results in as much as 432 MB used in each memory dump just for stacks. As the maximum number of threads continues to increase this number will get even larger.

Some embodiments of the present invention reduce memory required by the stacks to effectively reduce the overall memory dump file size.

Some embodiments of the present invention can be used to reduce memory dumps, thereby resulting in easier dump transfer (due to outage time and/or limited transfer capacity).

Figure 5:
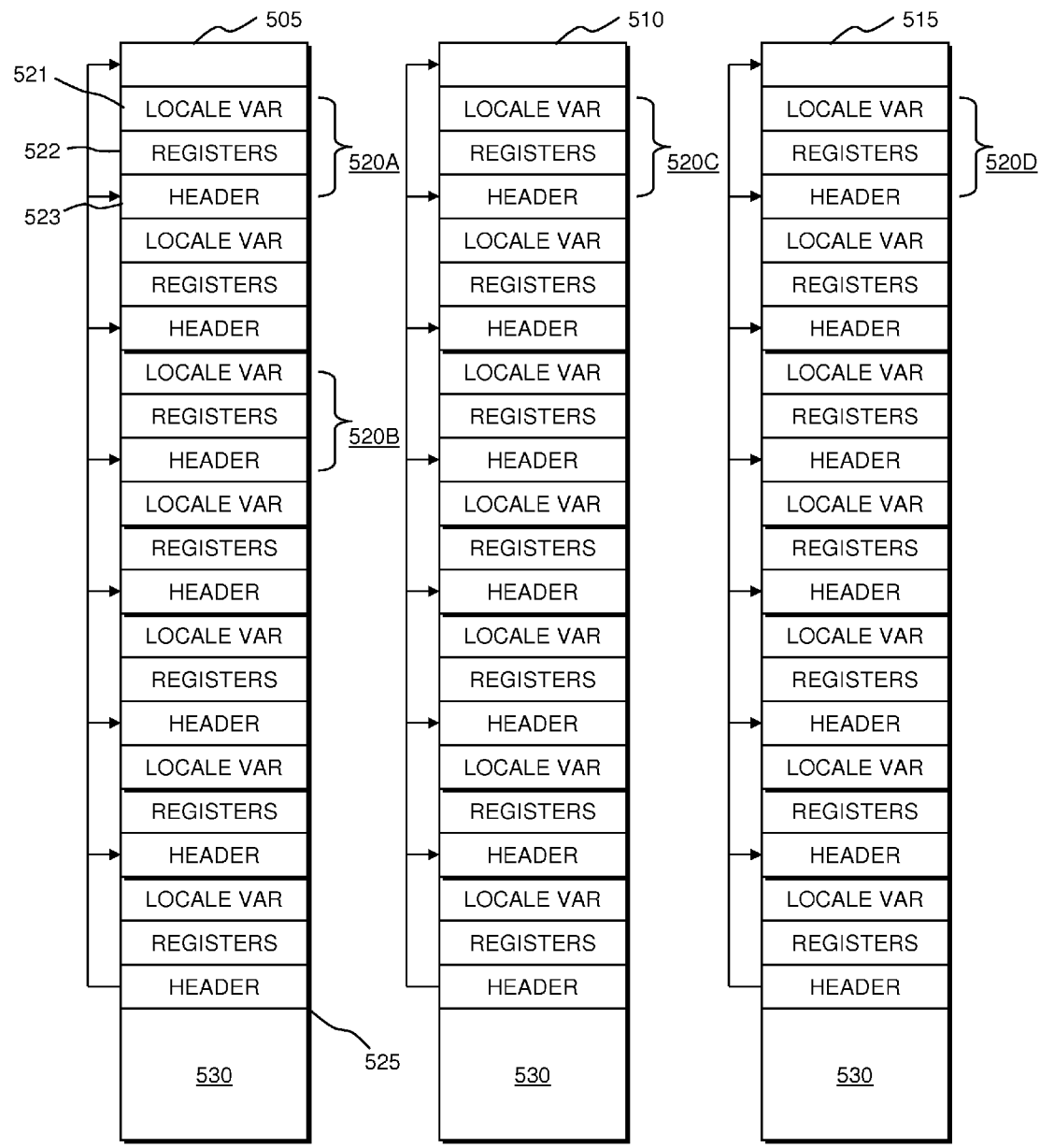
FIG. 5 is a block diagram of stacks of the type processed by various embodiments of the present disclosure.

In support of the following discussion, FIG. 5 shows three threads of a multi-thread memory dump including: active system thread stack 505; crashing system thread stack 510; non-system thread stack 515; four (4) current stackframes (including first stackframe 520A, second stackframe 520B, third stackframe 520C, and fourth stackframe 520D; local variable portions 521; register portions 522; header portions 523; end of current stack portion 525; and non-current stack portions 530. In this embodiment of the present invention, the various current stackframes 520 are prioritized and selected based on the prioritization to be: (i) included in the dump; or (ii) not included in the dump. While the rules and/or criteria for prioritization may vary from embodiment to embodiment, some possible prioritization rules will be discussed below.

The prioritization of stackframes in this embodiment implicitly recognizes that: (i) not all threads are equally important; (ii) not all stackframes are equally relevant; and (iii) not all contents of stackframes are equally important. In this embodiment, the important stackframes get saved, and the relatively unimportant stackframes do not get saved, with this determination being made on a stackframe by stackframe basis. For some systems, only 20% of the allocated stack size is used for valid parts of the stack, or important stackframes.

Going beyond an exclusive focus on current stackframe priority, some embodiments of the present invention provide a lossy process including: (i) prioritize stacks, stackframes, and stackframe parts (for example, local variable, registers, and/or header); and (ii) if dump file is too large, reduce dump file by removing low priority parts. In some embodiments, when excising data from the dump: (i) stack priority is considered more important than stackframe priority; and (ii) stackframe priority is considered more important than stackframe portion priority.

Some embodiments of the present invention assign priority to threads based on the following criteria: (i) sleeping threads have lower priority (T2); (ii) non-system threads have the lowest priority (T3); (v) system threads have the highest priority (T1). In some embodiments of the present invention, within a given thread, a later stackframe in a thread has a higher priority than an earlier stackframe in the same thread (for example, first stackframe 520A would be higher priority than second stackframe 520B because the first stackframe was created earlier in time. In some embodiments of the present invention, the local variable is a portion of a stackframe assigned a relatively low priority.

Some embodiments of the present invention use the following formula for prioritization:

$P = Tp * Fp * Cp$ $0 <= P <= 1$ (1 is highest priority)

where:

Tp is assigned as follows:
  sleeping threads have lower priority (Tp=0.3)
  non-system thread has lowest priority (Tp=0.1)
  active system thread (Tp=0.6)
  crashing system thread: Tp=1.0

Fp is calculated with the formula:

$Fp = 1.0 - (Fp \text{ number}/Fp \text{ count})$

Cp is assigned as follows:
  header: 1.0
  registers: 0.6
  local variable: 0.3

In some embodiments of the present invention, user-based priorities include: (i) table with errorcode and priority table; (ii) Errorhandler (Programcheckhandler) does lookup in table for errorcode entry; and/or (iii) if table entry is available for errorcode, replace defaults with table entry.

Some embodiments of the present invention perform thread dependency detection (TDD) in two stages: (i) detect same global variables in use via debug information (including locks, etc.); and (ii) without debug info, use reallocation tables to find commonly used locks.

Some embodiments of the present invention apply TDD information to determine prioritization of stackframes. The following formulas prioritize dependency information:

$P(T) = P * 1.0$ (if there is a dependency with the crashing thread and/or other related threads), and $P(T) = P * 0.8$ (no dependency)

Some embodiments of the present invention, for faster debug, include all information in the dump section, such as: (i) removed stackframe parts; and (ii) detected dependency queues.

Some embodiments of the present invention reduce dump size to an extent that the size of the dump is less than the maximum transfer size (herein called the threshold size). The process of reducing dump size in that scenario includes: (i) when the dump is greater than the threshold size, calculate stackframe priority and remove the remaining stackframe with the lowest priority (this is an iterative process that continues until removal of successive stack frames causes the memory dump size to fall below the threshold size); and (ii) iteratively reintroduce previously removed stack frames (for example, in order of decreasing priority) so that the size of the dump increases back up as close to the size threshold as possible without exceeding it.

An embodiment of the present invention for making a dump file is as follows: (i) create categories for stackframe parts; (ii) create prioritization for each stackframe part; (iii) with reference to prioritization, decide if stackframe part is to be dumped; (iv) remove minimum priority parts until dump file size is below a threshold amount; (v) add maximum priority parts until dump file is the designated maximum size; (vi) hide low priority frames during initial debug; and (vii) reduce aging dumps.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: non-exclusive or; for example, A and/or B means that: (i) A is true and B is false; or (ii) A is false and B is true; or (iii) A and B are both true.

User/subscriber: includes, but is not necessarily limited to, the following: (i) a single individual human; (ii) an artificial intelligence entity with sufficient intelligence to act as a user or subscriber; and/or (iii) a group of related users or subscribers.

Electrically Connected: means either directly electrically connected, or indirectly electrically connected, such that intervening elements are present; in an indirect electrical connection, the intervening elements may include inductors and/or transformers.

Mechanically connected: Includes both direct mechanical connections, and indirect mechanical connections made through intermediate components; includes rigid mechanical connections as well as mechanical connection that allows for relative motion between the mechanically connected components; includes, but is not limited to, welded connections, solder connections, connections by fasteners (for example, nails, bolts, screws, nuts, hook-and-loop fasteners, knots, rivets, quick-release connections, latches and/or magnetic connections), force fit connections, friction fit connections, connections secured by engagement caused by gravitational forces, pivoting or rotatable connections, and/or slidable mechanical connections.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (ii) in a single proximity within a larger piece of software code; (iii) located within a single piece of software code; (iv) located in a single storage device, memory or medium; (v) mechanically connected; (vi) electrically connected; and/or (vii) connected in data communication.

Software storage device: any device (or set of devices) capable of storing computer code in a non-transient manner in one or more tangible storage medium(s); "software storage device" does not include any device that stores computer code only as a signal.

Stack: a memory portion allocated for data from execution of a thread including any current stack portion(s) and any portion of the allocated memory portion that is not a current stack portion.

Current stack portion: any portion of a stack that is currently being used; for example, in some embodiments, the current stack portion is a single continuous portion that is "above" an end of stack pointer.

Current stackframes: any stackframe in a current stack portion.

Memory dump data: any set of data planned, designated and/or written to a memory dump file; not all memory dump data necessarily is written to the memory dump data file (for example, data may be removed from the "memory dump data" after it is planned for a memory dump data file, but before the file gets written); memory dump data may include data other than data from stacks, but many embodiments of the present disclosure are focused on what happens with memory dump data of stacks.

What is claimed is:

1. A computer program product comprising software stored on a non-transitory software storage device, the software comprising:
    first program instructions programmed to receive a memory dump data including a set of stack(s), including at least a first stack which includes a current stack portion;
    second program instructions programmed to remove from the memory dump data a first removed data portion that comes from a portion of the first stack to yield an optimized memory dump data;
    third program instructions programmed to determine respective ranking values for a plurality of ranked data portions from the set of stacks;
    fourth program instructions programmed to select a ranked data portion from the current stack portion of the first stack to be a first removed data portion based, at least in part, upon the ranking values; and
    fifth program instructions programmed to write the optimized memory dump data to a file.

2. The computer program product of claim 1 wherein the plurality of ranked data portions respectively correspond to current stackframe components.

3. The computer program product of claim 2 wherein the ranking values are based, at least in part, upon at least one of the following priorities: (i) thread priority; (ii) stackframe priority; and (iii) component priority.

4. The computer program product of claim 1 wherein the optimized memory dump data has a memory dump size and further comprising:
    third program instructions programmed to compare a threshold size with the memory dump size; and
    fourth program instructions programmed to determine whether the first removed data portion having a data portion size may be added to the optimized memory dump data without the memory dump size exceeding the threshold size.

5. A computer system comprising:
    a processor(s) set; and
    a software storage device;
    wherein:
    the processor set is structured, located, connected and/or programmed to run software stored on the software storage device; and the software comprises:
  first program instructions programmed to receive a memory dump data including a set of stack(s), including at least a first stack which includes a current stack portion;
  second program instructions programmed to remove from the memory dump data a first removed data portion that comes from a portion of the first stack to yield an optimized memory dump data;
  third program instructions programmed to determine respective ranking values for a plurality of ranked data portions from the set of stacks;
  fourth program instructions programmed to select a ranked data portion from the current stack portion of the first stack to be a first removed data portion based, at least in part, upon the ranking values; and
  fifth program instructions programmed to write the optimized memory dump data to a file.

6. The computer system of claim 5 wherein the plurality of ranked data portions respectively correspond to current stackframe components.

7. The computer system of claim 6 wherein the ranking values are based, at least in part, upon at least one of the following priorities: (i) thread priority; (ii) stackframe priority; and (iii) component priority.

8. The computer system of claim 5 wherein the optimized memory dump data has a memory dump size and further comprising:
  third program instructions programmed to compare a threshold size with the memory dump size; and
  fourth program instructions programmed to determine whether the first removed data portion having a data portion size may be added to the optimized memory dump data without the memory dump size exceeding the threshold size.

9. A computer system comprising:
  a processor(s) set; and
  a software storage device;
  wherein:
    the processor set is structured, located, connected and/or programmed to run software stored on the software storage device; and
    the software comprises:
      first program instructions programmed to receive a memory dump data including a set of stack(s), including at least a first stack which includes a current stack portion;
      second program instructions programmed to remove from the memory dump data a first removed data portion that comes from a portion of the first stack to yield an optimized memory dump data having a first memory dump size;
      third program instructions programmed to compare a threshold size with the first memory dump size; and
      fourth program instructions programmed to determine whether the first removed data portion having a data portion size may be added to the optimized memory dump data such that the optimized memory dump data has a second memory dump size without the second memory dump size exceeding the threshold size.

10. The computer system of claim 9 wherein the first removed data portion consists of data outside the current stack portion of the first stack and further comprising:
  fifth program instructions programmed to write the optimized memory dump data to a file.

11. The computer system of claim 9 further comprising:
  fifth program instructions programmed to determine respective ranking values for a plurality of ranked data portions from the set of stacks;
  sixth program instructions programmed to select a ranked data portion from the current stack portion of the first stack to be a first removed data portion based, at least in part, upon the ranking values; and
  seventh program instructions programmed to write the optimized memory dump data to a file.

12. The computer system of claim 11 wherein the plurality of ranked data portions respectively correspond to current stackframe components.

13. The computer system of claim 12 wherein the ranking values are based, at least in part, upon at least one of the following priorities: (i) thread priority; (ii) stackframe priority; and (iii) component priority.

* * * * *